United States Patent
Li et al.

(10) Patent No.: US 11,312,251 B2
(45) Date of Patent: Apr. 26, 2022

(54) ELECTRIC VEHICLE WIRELESS CHARGING METHOD, APPARATUS, AND SYSTEM

(71) Applicant: Huawei Technologies Co., Ltd., Shenzhen (CN)

(72) Inventors: Yingtao Li, Shenzhen (CN); Pinghua Wang, Shenzhen (CN); Zhixian Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 16/455,183

(22) Filed: Jun. 27, 2019

(65) Prior Publication Data

US 2019/0315246 A1 Oct. 17, 2019

Related U.S. Application Data

(63) Continuation of application No. PCT/CN2017/097424, filed on Aug. 14, 2017.

(30) Foreign Application Priority Data

Dec. 28, 2016 (CN) .......................... 201611242714.9

(51) Int. Cl.
*B60L 53/124* (2019.01)
*H02J 50/80* (2016.01)
(Continued)

(52) U.S. Cl.
CPC ........... *B60L 53/124* (2019.02); *B60L 53/126* (2019.02); *B60L 53/62* (2019.02); *B60L 53/65* (2019.02);
(Continued)

(58) Field of Classification Search
CPC ...... B60L 53/65; B60L 53/305; B60L 53/665; B60L 53/63; B60L 53/126; B60L 53/66; B60L 53/68; B60L 53/554; B60L 2240/622; H02J 7/00034; H02J 7/00036; H02J 7/007; H02J 7/00; H02J 50/12; H02J 50/80;
(Continued)

(56) References Cited

U.S. PATENT DOCUMENTS 9,371,007 B1 * 6/2016 Penilla .................. G06Q 50/06
9,754,300 B2 * 9/2017 Kempton ............... G06Q 50/06
(Continued)

FOREIGN PATENT DOCUMENTS

CN 102498633 A 6/2012
CN 104143228 A 11/2014
(Continued)

*Primary Examiner* — David V Henze-Gongola
*Assistant Examiner* — Tarikh Kanem Rankine
(74) *Attorney, Agent, or Firm* — Leydig, Voit & Mayer, Ltd.

(57) ABSTRACT

The present application relates to the field of automotive technologies, and provides an electric vehicle wireless charging method, an apparatus, and a system. A wireless charging station can charge an electric vehicle according to a charging request of the electric vehicle and charging permission of the electric vehicle prestored on the wireless charging station, so that resources of the wireless charging station are maximally used, and resource waste of the wireless charging station is avoided.

20 Claims, 8 Drawing Sheets

(51) Int. Cl.
  *H02J 50/90* (2016.01)
  *H02J 50/12* (2016.01)
  *H02J 50/20* (2016.01)
  *B60L 53/66* (2019.01)
  *B60L 53/65* (2019.01)
  *H02J 7/02* (2016.01)
  *B60L 53/68* (2019.01)
  *B60L 53/126* (2019.01)
  *B60L 53/62* (2019.01)
  *H02J 7/00* (2006.01)
  *B60L 53/122* (2019.01)

(52) U.S. Cl.
  CPC .............. *B60L 53/66* (2019.02); *B60L 53/68* (2019.02); *H02J 7/025* (2013.01); *H02J 50/12* (2016.02); *H02J 50/20* (2016.02); *H02J 50/80* (2016.02); *H02J 50/90* (2016.02); *B60L 53/122* (2019.02); *H02J 7/00045* (2020.01)

(58) Field of Classification Search
  CPC . H02J 50/90; H02J 50/10; H02J 50/40; Y02T 10/7044; Y02T 10/7005; Y02T 10/72; Y02T 10/705; Y02T 10/7055
  See application file for complete search history.

(56) References Cited

U.S. PATENT DOCUMENTS

| | | | |
|---|---|---|---|
| 10,144,307 B2* | 12/2018 | Newman | B60L 50/64 |
| 2010/0145540 A1* | 6/2010 | McKenna | H02J 13/0089 |
| | | | 700/295 |
| 2010/0241542 A1* | 9/2010 | Pinkusevich | B60L 53/14 |
| | | | 705/34 |
| 2010/0315197 A1* | 12/2010 | Solomon | G06F 21/31 |
| | | | 340/5.2 |
| 2011/0025267 A1* | 2/2011 | Kamen | B60L 8/003 |
| | | | 320/109 |
| 2011/0053500 A1 | 3/2011 | Menegoli et al. | |
| 2011/0057613 A1* | 3/2011 | Taguchi | B60L 53/305 |
| | | | 320/109 |
| 2011/0191265 A1* | 8/2011 | Lowenthal | G06Q 30/06 |
| | | | 705/412 |
| 2011/0241824 A1* | 10/2011 | Uesugi | B60L 53/305 |
| | | | 340/5.8 |
| 2011/0276448 A1* | 11/2011 | Perper | G06Q 30/04 |
| | | | 705/34 |
| 2011/0279226 A1 | 11/2011 | Chen et al. | |
| 2012/0098676 A1* | 4/2012 | Oizumi | B60L 53/11 |
| | | | 340/901 |
| 2012/0221473 A1 | 8/2012 | Redmann et al. | |
| 2012/0229089 A1* | 9/2012 | Bemmel | H02J 7/0013 |
| | | | 320/109 |
| 2013/0046660 A1* | 2/2013 | Lowenthal | G06Q 30/04 |
| | | | 705/30 |
| 2013/0110296 A1* | 5/2013 | Khoo | G01C 21/3492 |
| | | | 700/286 |
| 2013/0127417 A1* | 5/2013 | Karner | G06Q 30/0207 |
| | | | 320/109 |
| 2013/0141044 A1* | 6/2013 | Solomon | H02J 7/00 |
| | | | 320/109 |
| 2014/0062401 A1* | 3/2014 | Gadh | B60L 53/66 |
| | | | 320/109 |
| 2014/0266004 A1* | 9/2014 | Andrews, Jr. | B60L 53/53 |
| | | | 320/104 |
| 2014/0266046 A1* | 9/2014 | Baxter | H02J 7/007 |
| | | | 320/109 |
| 2014/0319923 A1 | 10/2014 | Lee et al. | |
| 2015/0032516 A1* | 1/2015 | Deshpande | G06Q 50/06 |
| | | | 705/13 |
| 2015/0066224 A1* | 3/2015 | Uyeki | G06Q 10/06314 |
| | | | 700/291 |
| 2015/0091506 A1* | 4/2015 | Hyde | B60L 53/64 |
| | | | 320/108 |
| 2015/0149221 A1* | 5/2015 | Tremblay | B60L 53/68 |
| | | | 705/5 |
| 2015/0266389 A1* | 9/2015 | Appelbaum | H02J 7/0027 |
| | | | 320/138 |
| 2015/0303714 A1* | 10/2015 | Keeling | B60L 53/00 |
| | | | 320/108 |
| 2015/0317755 A1* | 11/2015 | Tsuda | H02J 13/00028 |
| | | | 701/31.5 |
| 2015/0326040 A1* | 11/2015 | Kawai | H02J 7/0042 |
| | | | 320/162 |
| 2015/0340889 A1* | 11/2015 | Appelbaum | B60L 53/14 |
| | | | 320/109 |
| 2016/0039301 A1* | 2/2016 | Igarashi | B60L 53/31 |
| | | | 320/157 |
| 2017/0028865 A1* | 2/2017 | Konet | B60L 53/65 |
| 2017/0120758 A1 | 5/2017 | Xu et al. | |
| 2017/0136894 A1* | 5/2017 | Ricci | B60L 50/53 |
| 2017/0140349 A1* | 5/2017 | Ricci | B60L 53/665 |
| 2017/0274790 A1* | 9/2017 | Kim | B60L 53/68 |
| 2018/0105053 A1* | 4/2018 | Ahmed | H02J 50/80 |
| 2018/0215280 A1* | 8/2018 | Lee | B60L 11/1846 |

FOREIGN PATENT DOCUMENTS

| | | |
|---|---|---|
| CN | 104518529 A | 4/2015 |
| CN | 104519488 A | 4/2015 |
| CN | 104682489 A | 6/2015 |
| CN | 104701929 A | 6/2015 |
| CN | 104709231 A | 6/2015 |
| CN | 104779682 A | 7/2015 |
| CN | 104868552 A | 8/2015 |
| CN | 104935020 A | 9/2015 |
| CN | 105811034 A | 7/2016 |
| CN | 105870982 A | 8/2016 |
| CN | 105882440 A | 8/2016 |
| CN | 106208422 A | 12/2016 |
| CN | 106696738 A | 5/2017 |
| EP | 2985870 A1 | 2/2016 |
| GB | 2528911 A | 2/2016 |

* cited by examiner

ELECTRIC VEHICLE WIRELESS CHARGING METHOD, APPARATUS, AND SYSTEM

CROSS-REFERENCE TO RELATED APPLICATIONS

This application is a continuation of International Application No. PCT/CN2017/097424, filed on Aug. 14, 2017, which claims priority to Chinese Patent Application No. 201611242714.9, filed on Dec. 28, 2016. The disclosures of the aforementioned applications are hereby incorporated by reference in their entireties.

TECHNICAL FIELD

Embodiments of the present application relate to the field of automotive technologies, and in particular, to an electric vehicle wireless charging method, an apparatus, and a system.

BACKGROUND

With aggravation of energy shortage and environmental pollution problems of modern society, as a new energy vehicle, an electric vehicle attracts wide attention once launched. The electric vehicle is a vehicle powered by an in-vehicle power supply, using a motor to drive vehicle wheels, and obeying various requirements of road traffic and safety regulations. However, most of existing electric vehicles are limited by a battery capacity, and can run for a relatively short distance. In addition, a long battery charging time and shortage of corresponding charging station resources of electric vehicles become biggest bottlenecks that impede application and popularization of electric vehicles.

Methods for charging an electric vehicle usually include contact charging and wireless charging. The contact charging means electricity conduction through metallic contact between a plug and a socket, and the wireless charging means transferring electric energy by using a coupled electromagnetic field as a medium. Compared with the contact charging, the wireless charging is easy to perform, generates no spark, no electric shock risk, and no mechanical wear, can adapt to a plurality of severe environments and weather, can implement automatic charging and mobile charging, and so on, and therefore has become a main manner of charging the electric vehicle in the future. Currently, the electric vehicle wireless charging method usually includes the following several steps: (1) The electric vehicle initiates identity authentication to a wireless charging station. (2) If the identity authentication performed on the electric vehicle succeeds, the wireless charging station determines whether a battery of the electric vehicle meets a charging condition. (3) If the battery of the electric vehicle meets the charging condition, the wireless charging station charges the electric vehicle.

However, in the existing electric vehicle wireless charging method, the wireless charging station can only perform identity authentication on the electric vehicle, but cannot provide exclusive personalization services for different electric vehicles. Consequently, resources of the wireless charging station cannot be maximally used, and resource waste of the wireless charging station is caused.

SUMMARY

Embodiments of the present application provide an electric vehicle wireless charging method, an apparatus, and a system. A wireless charging station can charge an electric vehicle according to a charging request of the electric vehicle and charging permission of the electric vehicle prestored on the wireless charging station, so that resources of the wireless charging station are maximally used, and resource waste of the wireless charging station is avoided.

The following technical solutions are used in the embodiments of the present application to achieve the foregoing objective.

According to a first aspect, an embodiment of the present application provides an electric vehicle wireless charging method, including: first receiving, by a wireless charging station, a charging request that is sent by an electric vehicle and that is used to request the wireless charging station to wirelessly charge the electric vehicle, where the charging request includes a charging time request and a charging mode request, the charging time request includes at least one of charging duration requested by the electric vehicle and a start charging time requested by the electric vehicle, and the charging mode request includes at least one of a charging rate requested by the electric vehicle, a charging power requested by the electric vehicle, and management permission requested by the electric vehicle; then determining, by the wireless charging station, that the charging request matches charging permission of the electric vehicle prestored on the wireless charging station, and obtaining, according to the charging request, a charging configuration parameter corresponding to the charging request; and finally wirelessly charging, by the wireless charging station, the electric vehicle based on the charging configuration parameter. It can be learned that before the electric vehicle wireless charging method provided in this embodiment of the present application is used to charge the electric vehicle, the charging configuration parameter can be configured for the electric vehicle pertinently according to the charging request sent by the electric vehicle and the charging permission of the electric vehicle, so as to use the configured charging configuration parameter to charge the electric vehicle. In comparison with a conventional electric vehicle wireless charging method, different charging permission can be set for different electric vehicles, thereby meeting personalization charging requirements of different electric vehicles. In addition, because different electric vehicles have different charging permission, the wireless charging station can perform effective management on an electric vehicle based on charging permission of the electric vehicle, thereby avoiding resource waste of the wireless charging station.

In a first optional implementation of the first aspect, the method further includes: determining, by the wireless charging station, that the charging request does not match the charging permission of the electric vehicle prestored on the wireless charging station, and sending charging reject information to the electric vehicle, where the charging reject information is used to indicate that the charging request does not match the charging permission of the electric vehicle prestored on the wireless charging station, and the wireless charging station rejects charging the electric vehicle.

In a second optional implementation of the first aspect, after the sending, by the wireless charging station, charging reject information to the electric vehicle, the method further includes: receiving, by the wireless charging station, charging permission request information that is sent by the electric vehicle and that is used to request to change the charging permission of the electric vehicle prestored on the wireless charging station, and sending the charging permission request information to a management device; and then receiving, by the wireless charging station, charging permission response information sent by the management device, and obtaining changed charging permission of the electric vehicle, where the charging permission response information includes at least the changed charging permission of the electric vehicle configured by the management device for the electric vehicle. In this way, the wireless charging station can obtain the changed charging permission of the electric vehicle, so as to charge the electric vehicle.

In a third optional implementation of the first aspect, before the receiving, by a wireless charging station, a charging request of an electric vehicle, the method may further include: obtaining, by the wireless charging station, attribute information of the electric vehicle (including at least vehicle information and vehicle owner information of the electric vehicle); and determining, by the wireless charging station based on the vehicle information or based on the vehicle information and the vehicle owner information, that the wireless charging station has a function of charging the electric vehicle. In this way, the wireless charging station can determine whether a charging device of the wireless charging station matches the electric vehicle, in other words, whether the wireless charging station has the function of charging the electric vehicle. The wireless charging station can receive the charging request of the electric vehicle only when the wireless charging station has the function of charging the electric vehicle.

In a fourth optional implementation of the first aspect, before the obtaining, by the wireless charging station, attribute information of the electric vehicle, the method may further include: when the wireless charging station determines that the electric vehicle has a wireless communication function, and the electric vehicle is located within a charging range of the wireless charging station, establishing, by the wireless charging station, a wireless connection to the electric vehicle.

Optionally, that the electric vehicle is located within the charging range of the wireless charging station is usually that a wireless charging receiving apparatus in the electric vehicle is aligned with a wireless charging transmitting apparatus in the wireless charging station.

In a fifth optional implementation of the first aspect, the charging permission of the electric vehicle may be temporary charging permission, common charging permission, or management charging permission.

According to a second aspect, an embodiment of the present application provides an electric vehicle wireless charging method, including: first sending, by an electric vehicle to a wireless charging station, a charging request used to request the wireless charging station to wirelessly charge the electric vehicle, where the charging request includes a charging time request and a charging mode request, the charging time request includes at least one of charging duration requested by the electric vehicle and a start charging time requested by the electric vehicle, and the charging mode request includes at least one of a charging rate requested by the electric vehicle, a charging power requested by the electric vehicle, and management permission requested by the electric vehicle; and then receiving, by the electric vehicle, wireless charging performed by the wireless charging station on the electric vehicle based on a charging configuration parameter, where the charging configuration parameter is a charging configuration parameter that is corresponding to the charging request and that is obtained by the wireless charging station. It can be learned that before the electric vehicle wireless charging method provided in this embodiment of the present application is used to charge the electric vehicle, the charging configuration parameter can be configured for the electric vehicle pertinently according to the charging request sent by the electric vehicle and charging permission of the electric vehicle, so as to use the configured charging configuration parameter to charge the electric vehicle. In comparison with a conventional electric vehicle wireless charging method, different charging permission can be set for different electric vehicles, thereby meeting personalization charging requirements of different electric vehicles. In addition, because different electric vehicles have different charging permission, the wireless charging station can perform effective management on an electric vehicle based on charging permission of the electric vehicle, thereby avoiding resource waste of the wireless charging station.

In a first optional implementation of the second aspect, after the sending, by an electric vehicle, a charging request to a wireless charging station, the method further includes: receiving, by the electric vehicle, charging reject information sent by the wireless charging station, where the charging reject information is used to indicate that the charging request does not match charging permission of the electric vehicle prestored on the wireless charging station, and the wireless charging station rejects charging the electric vehicle.

In a second optional implementation of the second aspect, after the receiving, by the electric vehicle, charging reject information sent by the wireless charging station, the method further includes: sending, by the electric vehicle to the wireless charging station, charging permission request information used to request to change the charging permission of the electric vehicle prestored on the wireless charging station, so that the wireless charging station can obtain changed charging permission of the electric vehicle, to charge the electric vehicle.

In a third optional implementation of the second aspect, before the sending, by an electric vehicle, a charging request to a wireless charging station, the method further includes: establishing, by the electric vehicle, a wireless connection to the wireless charging station.

In a fourth optional implementation of the second aspect, the charging permission of the electric vehicle may be temporary charging permission, common charging permission, or management charging permission.

According to a third aspect, an embodiment of the present application provides a wireless charging station, and the wireless charging station includes a receiving module, a determining module, an obtaining module, and a charging module. Specifically, the receiving module is configured to receive a charging request sent by an electric vehicle, where the charging request is used to request the wireless charging station to wirelessly charge the electric vehicle, the charging request includes a charging time request and a charging mode request, the charging time request includes at least one of charging duration requested by the electric vehicle and a start charging time requested by the electric vehicle, and the charging mode request includes at least one of a charging rate requested by the electric vehicle, a charging power requested by the electric vehicle, and management permission requested by the electric vehicle. The determining module is configured to: after the receiving module receives the charging request sent by the electric vehicle, determine that the charging request matches charging permission of the electric vehicle prestored on the wireless charging station. The obtaining module is configured to: after the determining module determines that the charging request matches the charging permission of the electric vehicle prestored on the wireless charging station, obtain, according to the charging request, a charging configuration parameter corresponding to the charging request. The charging module is configured to: after the obtaining module obtains the charging configuration parameter corresponding to the charging request, wirelessly charge the electric vehicle based on the charging configuration parameter.

In a first optional implementation of the third aspect, the determining module is further configured to: after the receiving module receives the charging request sent by the electric vehicle, determine that the charging request matches charging permission of the electric vehicle prestored on the wireless charging station. The wireless charging station further includes a sending module. Specifically, the sending module is configured to: after the determining module determines that the charging request does not match the charging permission of the electric vehicle prestored on the wireless charging station, send charging reject information to the electric vehicle, where the charging reject information is used to indicate that the charging request does not match the charging permission of the electric vehicle prestored on the wireless charging station, and the wireless charging station rejects charging the electric vehicle.

In a second optional implementation of the third aspect, the receiving module is further configured to: after the sending module sends the charging reject information to the electric vehicle, receive charging permission request information sent by the electric vehicle, where the charging permission request information is used to request to change the charging permission of the electric vehicle prestored on the wireless charging station; the sending module is further configured to: after the receiving module receives the charging permission request information sent by the electric vehicle, send the charging permission request information to a management device; the receiving module is further configured to: after the sending module sends the charging permission request information to the management device, receive charging permission response information sent by the management device, where the charging permission response information includes at least changed charging permission of the electric vehicle configured by the management device for the electric vehicle; and the obtaining module is further configured to: after the receiving module receives the charging permission response information sent by the management device, obtain the changed charging permission of the electric vehicle.

In a third optional implementation of the third aspect, the obtaining module is further configured to: before the receiving module receives the charging request sent by the electric vehicle, obtain attribute information of the electric vehicle, where the attribute information includes at least vehicle information and vehicle owner information of the electric vehicle; and the determining module is configured to: after the obtaining module obtains the attribute information of the electric vehicle, determine, based on the vehicle information or based on the vehicle information and the vehicle owner information, that the wireless charging station has a function of charging the electric vehicle.

In a fourth optional implementation of the third aspect, the determining module is further configured to: before the obtaining module obtains the attribute information of the electric vehicle, determine that the electric vehicle has a wireless communication function, and the electric vehicle is located within a charging range of the wireless charging station. The wireless charging station further includes a connection module. Specifically, the connection module is configured to: after the determining module determines that the electric vehicle has the wireless communication function, and the electric vehicle is located within the charging range of the wireless charging station, establish a wireless connection to the electric vehicle.

In a fifth optional implementation of the third aspect, the charging permission of the electric vehicle may be temporary charging permission, common charging permission, or management charging permission.

For specific descriptions of the third aspect and the implementations of the third aspect of the embodiments of the present application, refer to specific descriptions of the first aspect and the implementations of the first aspect. In addition, for beneficial effects of the third aspect and the implementations of the third aspect, refer to beneficial effect analysis in the first aspect and the implementations of the first aspect. Details are not described herein again.

According to a fourth aspect, an embodiment of the present application provides an electric vehicle, and the electric vehicle includes a sending module and a charging module. Specifically, the sending module is configured to send a charging request to a wireless charging station, where the charging request is used to request the wireless charging station to wirelessly charge the electric vehicle, the charging request includes a charging time request and a charging mode request, the charging time request includes at least one of charging duration requested by the electric vehicle and a start charging time requested by the electric vehicle, and the charging mode request includes at least one of a charging rate requested by the electric vehicle, a charging power requested by the electric vehicle, and management permission requested by the electric vehicle; and the charging module is configured to: after the sending module sends the charging request to the wireless charging station, receive wireless charging performed by the wireless charging station on the electric vehicle based on a charging configuration parameter, where the charging configuration parameter is a charging configuration parameter that is corresponding to the charging request and that is obtained by the wireless charging station.

In a first optional implementation of the fourth aspect, the electric vehicle further includes a receiving module. Specifically, the receiving module is configured to: after the sending module sends the charging request to the wireless charging station, receive charging reject information sent by the wireless charging station, where the charging reject information is used to indicate that the charging request does not match charging permission of the electric vehicle prestored on the wireless charging station, and the wireless charging station rejects charging the electric vehicle.

In a second optional implementation of the fourth aspect, the sending module is further configured to: after the receiving module receives the charging reject information sent by the wireless charging station, send charging permission request information to the wireless charging station, where the charging permission request information is used to request to change the charging permission of the electric vehicle prestored on the wireless charging station.

In a third optional implementation of the fourth aspect, the electric vehicle further includes a connection module. Specifically, the connection module is configured to: before the sending module sends the charging request to the wireless charging station, establish a wireless connection to the wireless charging station.

In a fourth optional implementation of the fourth aspect, the charging permission of the electric vehicle may be temporary charging permission, common charging permission, or management charging permission.

For specific descriptions of the fourth aspect and the implementations of the fourth aspect of the embodiments of the present application, refer to specific descriptions of the second aspect and the implementations of the second aspect. In addition, for beneficial effects of the fourth aspect and the implementations of the fourth aspect, refer to beneficial effect analysis in the second aspect and the implementations of the second aspect. Details are not described herein again.

According to a fifth aspect, an embodiment of the present application provides a wireless charging system, including a management device, a wireless charging station having any feature in the third aspect, and at least one electric vehicle having any feature in the fourth aspect.

For specific descriptions of the fifth aspect and the implementations of the fifth aspect of the embodiments of the present application, refer to specific descriptions of the first and second aspects and the implementations of the first and second aspects. In addition, for beneficial effects of the fifth aspect and the implementations of the fifth aspect, refer to beneficial effect analysis in the first and second aspects and the implementations of the first and second aspects. Details are not described herein again.

In the embodiments of the present application, names of the wireless charging station and the electric vehicle constitute no limitation on the devices or the functional modules. In actual implementation, the devices or the functional modules may have other names. Any device or functional module with a function similar to that in the embodiments of the present application falls within the scope of the following claims and their equivalent technologies of the present application.

These aspects or other aspects of the embodiments of the present application may be clearer in the following description.

DESCRIPTION OF EMBODIMENTS

In the following description, specific details such as a particular system structure, interface, and technology are set forth in an illustrative but not a restrictive sense to make a thorough understanding of the embodiments of the present application. However, a person skilled in the art should know that the embodiments of the present application may be implemented in other embodiments without these specific details. In other cases, detailed descriptions of well-known apparatuses, circuits, and methods are omitted, so that the embodiments of the present application are described without being obscured by unnecessary details.

The terms "system" and "network" are often used interchangeably in this specification. The terms "include," "contain," and any other variants in the specification, claims, and the accompanying drawings of the embodiments of the present application are intended to cover the non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The technology described in the embodiments of the present application may be applied to various wireless charging systems for charging an electric vehicle. The electric vehicle is a new energy vehicle, and the electric vehicle is charged by using the wireless charging system, so that a power battery capacity configured for the electric vehicle can be significantly reduced through charging while an electric vehicle driving distance is ensured. In this way, a body weight of the electric vehicle is reduced, and effective utilization of energy is improved. In addition, initial acquisition costs of the electric vehicle are reduced, thereby accelerating marketing of the electric vehicle.

Figure 1:
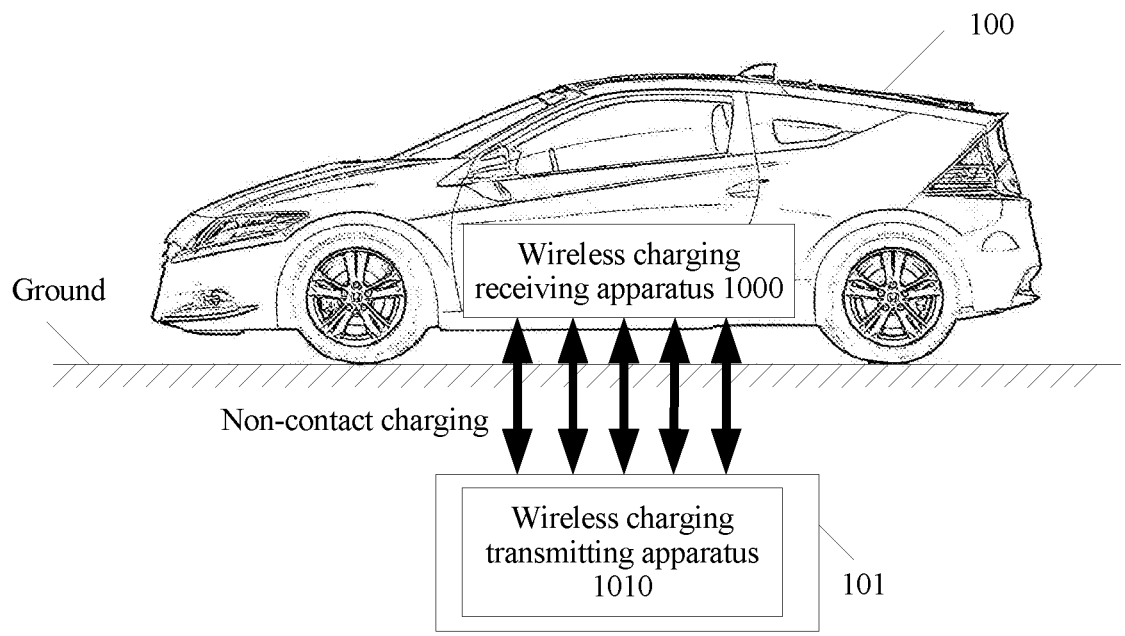
FIG. 1 is an architectural diagram of a wireless charging system according to an embodiment of the present application.

FIG. 1 is an architectural diagram of a wireless charging system, and the wireless charging system may include at least an electric vehicle 100 and a wireless charging station 101. Specifically, the electric vehicle 100 may include a wireless charging receiving apparatus 1000, and the wireless charging station 101 may include a wireless charging transmitting apparatus 1010. Currently, in a process of charging the electric vehicle by the wireless charging system, the wireless charging receiving apparatus 1000 in the electric vehicle 100 cooperates with the wireless charging transmitting apparatus 1010 in the wireless charging station 101 to perform non-contact charging.

Further, the wireless charging station 101 may be specifically a fixed wireless charging station, a fixed wireless charging parking space, a wireless charging road, or the like. The wireless charging transmitting apparatus 1010 may be disposed on the ground, or buried under the ground (FIG. 1 shows a case in which the wireless charging transmitting apparatus 1010 is buried under the ground), and can charge the electric vehicle 100 located above the wireless charging transmitting apparatus 1010. The wireless charging receiving apparatus 1000 may be specifically integrated into the bottom of the electric vehicle 100. When the electric vehicle 100 enters a wireless charging range of the wireless charging transmitting apparatus 1010, the electric vehicle 100 may be charged in a wireless charging manner.

Optionally, the non-contact charging mentioned in this embodiment of the present application may be wireless energy transfer performed by the wireless charging receiving apparatus 1000 and the wireless charging transmitting apparatus 1010 through coupling by using an electric field or a magnetic field, and may be specifically performed through electric field induction, magnetic induction, magnetic resonance, or wireless radiation. This is not specifically limited in this embodiment of the present application. Further, the electric vehicle 100 and the wireless charging station 101 may perform bidirectional charging. In other words, the wireless charging station 101 charges the electric vehicle 100 by using a power supply, or the electric vehicle 100 discharges to the power supply.

However, an existing electric vehicle wireless charging method usually can only perform identity authentication on an electric vehicle, and a wireless charging station can charge the electric vehicle only when the identity authentication performed on the electric vehicle succeeds and a battery of the electric vehicle meets a charging condition. In the electric vehicle wireless charging method, the wireless charging station can only perform identity authentication on the electric vehicle, but cannot provide exclusive personalization services for different electric vehicles. Consequently, resources of the wireless charging station cannot be maximally used, and resource waste of the wireless charging station is caused.

The embodiments of the present application provide an electric vehicle wireless charging method. A wireless charging station can charge an electric vehicle according to a charging request of the electric vehicle and charging permission of the electric vehicle prestored on the wireless charging station, so that resources of the wireless charging station are maximally used, and resource waste of the wireless charging station is avoided.

The following describes in detail structures of devices in this embodiment of the present application.

Figure 2:
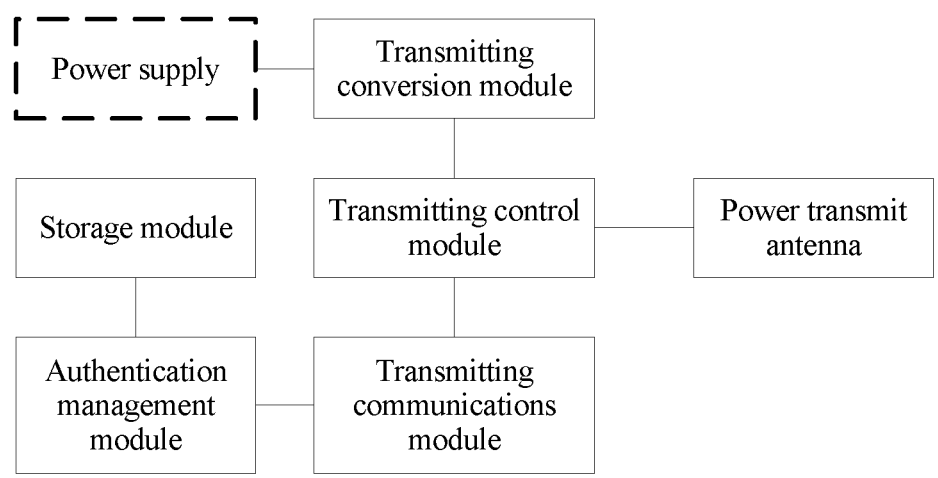
FIG. 2 is a schematic structural diagram of a wireless charging transmitting apparatus in a wireless charging station according to an embodiment of the present application.

FIG. 2 is a schematic structural diagram of the wireless charging transmitting apparatus in the wireless charging station. The wireless charging transmitting apparatus includes a transmitting conversion module, a power transmit antenna, a transmitting control module connected to both the transmitting conversion module and the power transmit antenna, a transmitting communications module connected to the transmitting control module, an authentication management module connected to the transmitting communications module, and a storage module connected to the authentication management module.

The transmitting conversion module may be connected to a power supply, and is configured to obtain energy from the power supply, and convert an alternating current or a direct current of the power supply into a high-frequency alternating current. When the power supply inputs an alternating current, the transmitting conversion module includes a power factor correction unit (not shown in FIG. 2) and an inverter unit (not shown in FIG. 2); or when the power supply inputs a direct current, the transmitting conversion module includes an inverter unit (not shown in FIG. 2) and a voltage conversion unit (not shown in FIG. 2).

The power factor correction unit can ensure that an input current phase of the wireless charging system is consistent with a power grid voltage phase, to reduce system harmonic content and increase a power factor value, thereby reducing pollution to a power grid that is generated by the wireless charging system, and improving security and reliability. The power factor correction unit may further reduce an output voltage of the power factor correction unit based on a back stage requirement. The inverter unit may convert the voltage that is output by the power factor correction unit into a high-frequency alternating current voltage, and apply the high-frequency alternating current voltage to the power transmit antenna. The high-frequency alternating current voltage can greatly improve transmitting efficiency and increase a transmission distance.

It should be noted that the power supply may be a power supply disposed inside the wireless charging transmitting apparatus, or an external power supply disposed outside the wireless charging transmitting apparatus. This is not specifically limited in the present application.

The transmitting control module is configured to: control voltage, current, and frequency conversion parameter adjustment of the transmitting conversion module based on an actual wireless charging transmit power requirement, and control voltage and current output adjustment of a high-frequency alternating current in the power transmit antenna.

The power transmit antenna is configured to convert the high-frequency alternating current into a resonant voltage and current by using a network mainly including devices such as an inductor and a capacitor. It may be understood that based on different connection manners of the inductor and the capacitor, a frequently used network structure of the power transmit antenna is specifically shown in Table 1 and FIG. 3.

TABLE 1

Figure 3:
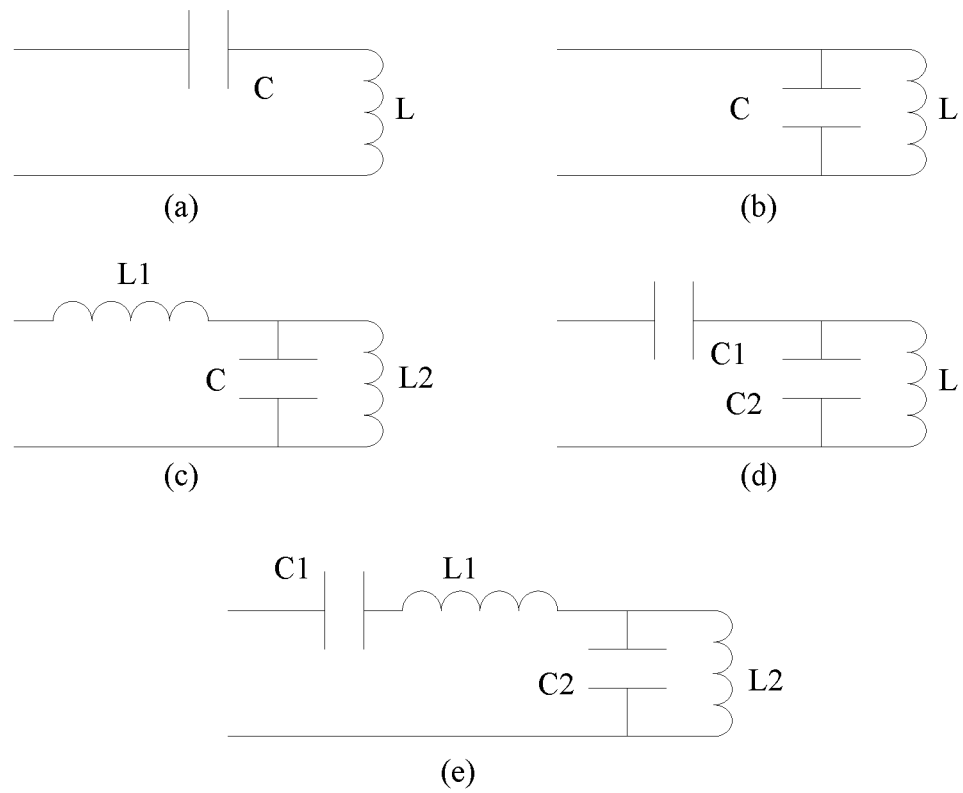
FIG. 3 is a schematic diagram of a network structure of a power transmit antenna according to an embodiment of the present application.

| Antenna design | Connection manner |
| --- | --- |
| S mode | As shown in FIG. 3 (a), one end of an inductor L is connected to one end of a capacitor C |
| P mode | As shown in FIG. 3 (b), one end of an inductor L is connected to one end of a capacitor C, and the other end of the inductor L is connected to the other end of the capacitor C |
| LCL mode | As shown in FIG. 3 (c), one end of an inductor L1 is connected to one end of a capacitor C and one end of an inductor L2, and the other end of the capacitor C is connected to the other end of the inductor L2 |
| LCC mode | As shown in FIG. 3 (d), one end of a capacitor C1 is connected to one end of a capacitor C2 and one end of an inductor L, and the other end of the capacitor C2 is connected to the other end of the inductor L |

TABLE 1-continued

| Antenna design | Connection manner |
|---|---|
| LCLC mode | As shown in FIG. 3 (e), one end of a capacitor C1 is connected to one end of an inductor L1, the other end of the inductor L1 is connected to one end of a capacitor C2 and one end of an inductor L2, and the other end of the capacitor C2 is connected to the other end of the inductor L2 |

The transmitting communications module is used for wireless communication between the wireless charging transmitting apparatus and the wireless charging receiving apparatus. The wireless charging transmitting apparatus may receive attribute information of the electric vehicle, a charging request, and mutual authentication information that are sent by the wireless charging receiving apparatus. In addition, the wireless charging transmitting apparatus may further send wireless charging transmitting control information, mutual authentication information, historical wireless charging data information, and the like to the wireless charging receiving apparatus. Specifically, a manner of wireless communication may include but is not limited to any one or any combination of Bluetooth, Wireless Fidelity (WiFi), ZigBee, a radio frequency identification (RFID) technology, a long range (Lora) wireless technology, and a Near Field Communication (NFC) technology. The transmitting communications module may further communicate with an intelligent terminal of a user to which the electric vehicle belongs, and the user implements remote authentication and user information transmission by using a communication function.

The authentication management module is used for mutual authentication and permission management of the wireless charging transmitting apparatus and the electric vehicle in the wireless charging system.

The storage module is configured to store charging process data, mutual authentication data (for example, the mutual authentication information), and permission management data (for example, permission management information) of the wireless charging transmitting apparatus. The mutual authentication data and the permission management data may be factory settings or may be set by a user. This is not specifically limited in this embodiment of the present application.

Figure 4:
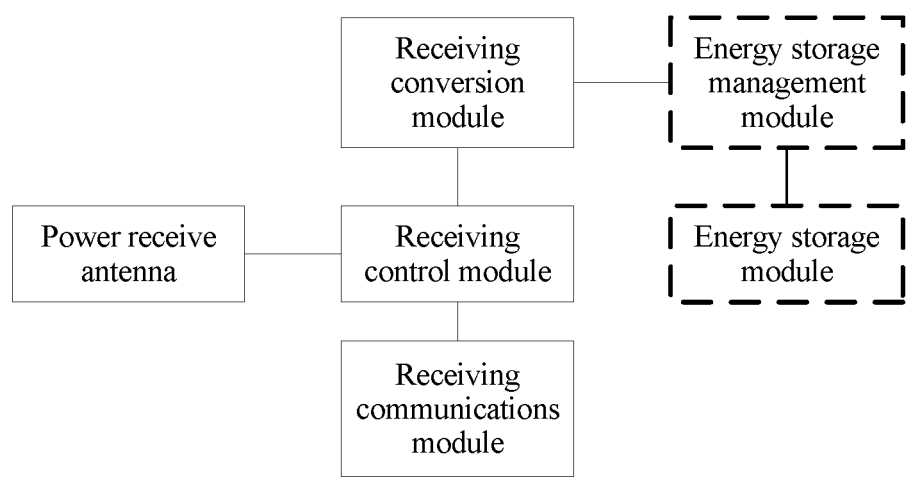
FIG. 4 is a schematic structural diagram of a wireless charging receiving apparatus in an electric vehicle according to an embodiment of the present application.

FIG. 4 is a schematic structural diagram of the wireless charging receiving apparatus in the electric vehicle. The wireless charging receiving apparatus includes a power receive antenna, a receiving control module connected to the power receive antenna, and a receiving conversion module and a receiving communications module that are connected to the receiving control module. Further, the receiving conversion module may be connected to an energy storage management module and an energy storage module, and uses received energy to charge the energy storage module, so as to drive the electric vehicle.

It should be noted that the energy storage management module and the energy storage module may be disposed inside or outside the wireless charging receiving apparatus. This is not specifically limited in this embodiment of the present application.

The power receive antenna is configured to receive active power and reactive power transmitted by a transmit end. It may be understood that based on different connection manners of an inductor and a capacitor, a frequently used network structure of the power receive antenna is the same as the network structure of the power transmit antenna shown in Table 1 and FIG. 3. For brevity, details are not described herein again.

It should be noted that the power transmit antenna and the power receive antenna in the wireless charging system may be combined at random, and frequently used network structure combination forms include an S-S mode, a P-P mode, an S-P mode, a P-S mode, an LCL-LCL mode, and an LCL-P mode. This is not specifically limited in this embodiment of the present application.

In addition, to implement a bidirectional charging function of the wireless charging system, the wireless charging transmitting apparatus and the wireless charging receiving apparatus in the wireless charging system each may include a power receive antenna and a power transmit antenna, specifically in an independent or integrated manner.

The receiving control module is configured to control voltage, current, and frequency conversion parameter adjustment of the receiving conversion module based on an actual wireless charging receive power requirement.

The receiving conversion module is configured to convert a high-frequency resonant current and voltage received by the power receive antenna into a direct current voltage and a direct current required by the energy storage module for charging. The receiving conversion module usually includes a rectifier unit (not shown in FIG. 4) and a direct current conversion unit (not shown in FIG. 4). The rectifier unit converts the high-frequency resonant current and voltage received by the power receive antenna into the direct current voltage and the direct current, and the direct current conversion unit provides the direct current voltage for a back stage charging circuit, so as to implement charging in a constant mode.

The receiving communications module is used for wireless communication between the wireless charging transmitting apparatus and the wireless charging receiving apparatus. Specifically, a function of the receiving communications module is corresponding to a function of the transmitting communications module in the wireless charging transmitting apparatus. For brevity, details are not described herein.

It should be added that the wireless charging station provided in this embodiment of the present application may be disposed in various scenarios such as a parking lot, a private parking space, and a charging station platform.

Figure 5:
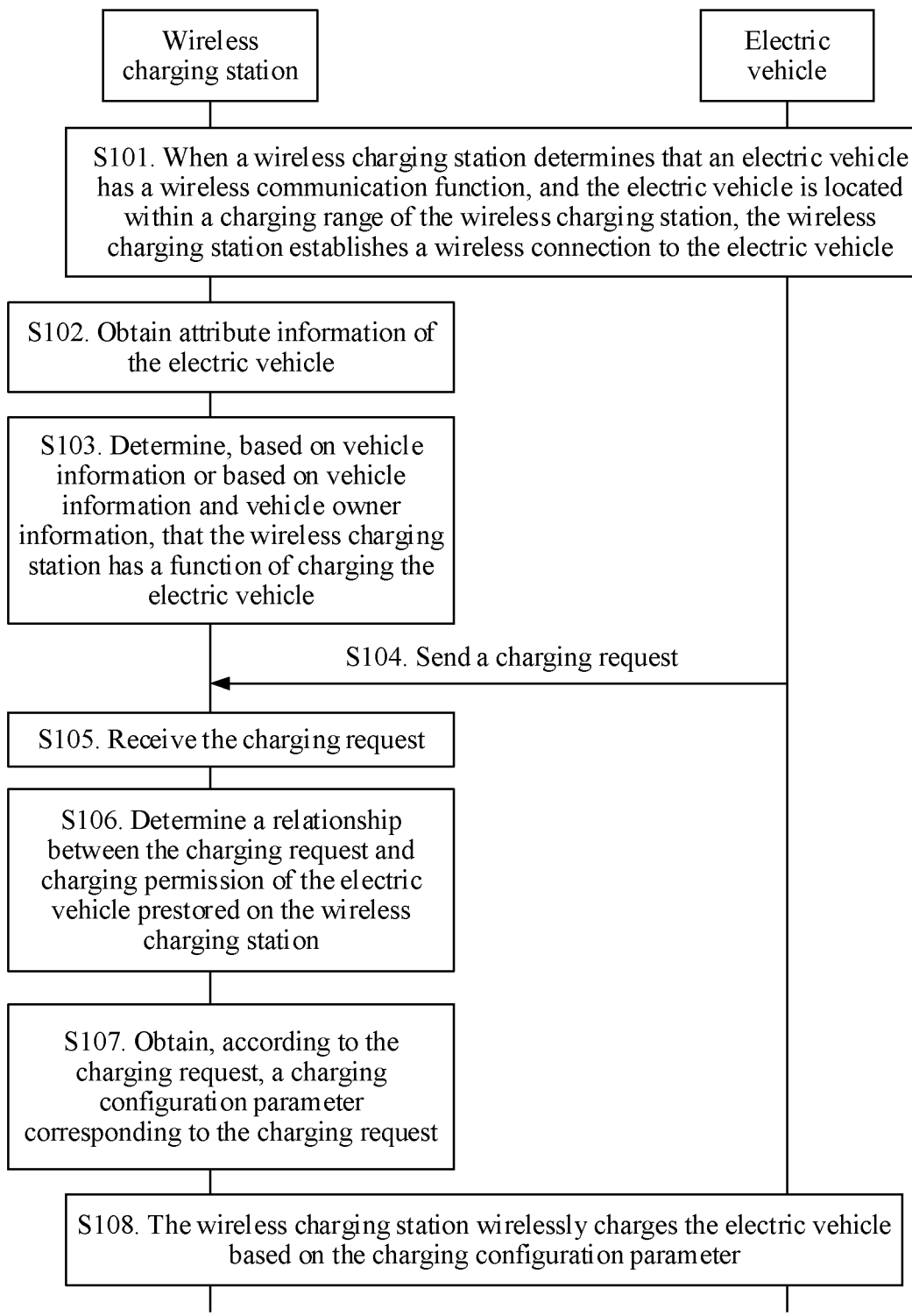
FIG. 5 is a first schematic flowchart of an electric vehicle wireless charging method according to an embodiment of the present application.

FIG. 5 is a schematic flowchart of an electric vehicle wireless charging method according to an embodiment of the present application. The electric vehicle wireless charging method may be applied to various wireless charging systems for charging an electric vehicle.

Referring to FIG. 5, the electric vehicle wireless charging method includes step S101 to S108.

S101. When a wireless charging station determines that an electric vehicle has a wireless communication function, and the electric vehicle is located within a charging range of the wireless charging station, the wireless charging station establishes a wireless connection to the electric vehicle.

In this embodiment of the present application, to implement charging the electric vehicle by the wireless charging station, the wireless charging station first needs to establish the wireless connection to the electric vehicle. A manner of the wireless connection may be any one or more of Bluetooth, WiFi, ZigBee, RFID, Lora, and NFC.

Specifically, a method in which the wireless charging station determines whether the electric vehicle has the wireless communication function may be: When the electric vehicle is located within the charging range of the wireless charging station, the wireless charging station uses a wireless charging communication protocol or a coil coupling coefficient between the wireless charging station and the electric vehicle to determine whether the electric vehicle has the wireless communication function.

It should be noted that to enhance signal strength and electric field strength between the electric vehicle and the wireless charging station, that the electric vehicle is located within the charging range of the wireless charging station is usually that a wireless charging receiving apparatus in the electric vehicle is aligned with a wireless charging transmitting apparatus in the wireless charging station. That the wireless charging receiving apparatus is aligned with the wireless charging transmitting apparatus is usually that a power receiving coil in the wireless charging receiving apparatus is spatially aligned with a power transmitting coil in the wireless charging transmitting apparatus. Specifically, a process of determining whether the wireless charging receiving apparatus in the electric vehicle is aligned with the wireless charging transmitting apparatus in the wireless charging station may be completed by vehicle position determining sensors or a vehicle position determining sensor configured in the wireless charging station and/or the electric vehicle, and the vehicle position determining sensor is configured to detect whether an electric vehicle enters the wireless charging station and parks in a proper charging position.

Specifically, the vehicle position determining sensor may be but is not limited to an infrared sensor, an ultrasonic sensor, and a pressure sensor. For example, a sensing method of the infrared sensor is using an infrared technology to detect whether there is an object parking in the wireless charging station; a sensing method of the ultrasonic sensor is determining a distance between an obstacle and the ground based on a distance between an ultrasonic transmit end and an ultrasonic receive end, to determine whether there is an electric vehicle in the wireless charging station; and a sensing method of the pressure sensor is determining whether there is an electric vehicle in the wireless charging station by detecting whether there is a weight increase in all of four wheel positions of a parking space in the wireless charging station, after pressure sensors are installed under the four wheel positions of the parking space.

S102. The wireless charging station obtains attribute information of the electric vehicle, where the attribute information includes at least vehicle information and vehicle owner information of the electric vehicle.

S103. The wireless charging station determines, based on the vehicle information or based on the vehicle information and the vehicle owner information, that the wireless charging station has a function of charging the electric vehicle.

After the wireless charging station establishes the wireless connection to the electric vehicle, the wireless charging station determines that the electric vehicle has the wireless communication function, but the wireless communication function of the electric vehicle may not match the wireless charging station. Therefore, the wireless charging station may obtain the attribute information of the electric vehicle, and perform authorization and authentication on the electric vehicle, to determine that the wireless charging station has the function of charging the electric vehicle.

Specifically, the vehicle information may be specifically but is not limited to a model of the electric vehicle, an engine number of the electric vehicle, a license plate number of the electric vehicle, and a type and a parameter of the in-vehicle wireless charging receiving apparatus in the electric vehicle. The vehicle owner information may be but is not limited to information such as an owner authentication identity (Identity, ID) of the electric vehicle, an owner name of the electric vehicle, owner historical charging records of the electric vehicle, and an owner ID card number of the electric vehicle.

For example, the wireless charging station may store a list of correspondences between vehicle information (including a model of an electric vehicle and a license plate number of the electric vehicle), vehicle owner information (including an owner name of the electric vehicle), and whether the wireless charging station has a function of charging the electric vehicle, as shown in Table 2.

TABLE 2

| Vehicle information | | Vehicle owner information | Whether the wireless charging station |
|---|---|---|---|
| Model of an electric vehicle | License plate number of the electric vehicle | (owner name of the electric vehicle) | has a function of charging the electric vehicle |
| Brand A Model x | Jing A11111 | Li XX | Yes |
| Brand B Model y | Hu B22222 | Zhang XX | No |
| Brand C Model z | Shaan C33333 | Zhao XX | Yes |
| . . . | . . . | . . . | . . . |

It can be learned from Table 2 that when the wireless charging station learns that the model of the electric vehicle is Brand A Model x, the license plate number is Jing A11111, and the owner name is Li XX, the wireless charging station may learn from Table 2 that the wireless charging station has the function of charging the electric vehicle; likewise, when the wireless charging station learns that the model of the electric vehicle is Brand B Model y, the license plate number is Hu B22222, and the owner name is Zhang XX, the wireless charging station may learn from Table 2 that the wireless charging station does not have the function of charging the electric vehicle; and when the wireless charging station learns that the model of the electric vehicle is Brand C Model z, the license plate number is Shaan C33333, and the owner name is Zhao XX, the wireless charging station may learn from Table 2 that the wireless charging station has the function of charging the electric vehicle.

It should be noted that if the wireless charging station cannot find corresponding information in Table 2 based on the obtained vehicle information and vehicle owner information, in other words, an owner of the electric vehicle has not charged the vehicle in the wireless charging station, the wireless charging station may determine, based on only the vehicle information, that the wireless charging station has the function of charging the electric vehicle.

S104. The electric vehicle sends a charging request to the wireless charging station.

The wireless charging station can charge the electric vehicle only when the wireless charging station has the function of charging the electric vehicle. Therefore, the electric vehicle may send the charging request of the electric vehicle to the wireless charging station. Correspondingly, the wireless charging station may receive the charging request of the electric vehicle.

The charging request is used to request the wireless charging station to wirelessly charge the electric vehicle, the charging request includes a charging time request and a charging mode request, the charging time request includes at least one of charging duration requested by the electric vehicle and a start charging time requested by the electric vehicle, and the charging mode request includes at least one of a charging rate requested by the electric vehicle, a charging power requested by the electric vehicle, and management permission requested by the electric vehicle.

For example, when an electric vehicle of Brand A Model x with the license plate number Jing A11111 and the owner name Li XX sends a charging request to the wireless charging station at 17:00 on Dec. 20, 2016, the charging request may be requesting the wireless charging station to charge the electric vehicle for two hours from 18:00 on Dec. 20, 2016 at a charging rate of 0.5 yuan/kilowatt-hour and a charging power of 1000 watts without requesting management permission by the electric vehicle.

For another example, when an electric vehicle of Brand B Model y with the license plate number Hu B22222 and the owner name Zhang XX belongs to a same user as the wireless charging station, the electric vehicle can have management permission for the wireless charging station. The electric vehicle sends a charging request to the wireless charging station at 10:00 on Dec. 21, 2016, and the charging request may be requesting the wireless charging station to charge the electric vehicle for one hour from 10:00 on Dec. 21, 2016 at a charging rate of 0.4 yuan/kilowatt-hour and a charging power of 2000 watts. In addition, the electric vehicle may request the management permission, to perform management (operations such as changing, deleting, and adding) on charging permission of each electric vehicle prestored on the wireless charging station.

S105. The wireless charging station receives the charging request sent by the electric vehicle.

S106. The wireless charging station determines a relationship between the charging request and charging permission of the electric vehicle prestored on the wireless charging station.

It should be noted that the charging permission of the electric vehicle may be but is not limited to temporary charging permission, common charging permission, or management charging permission. The management charging permission may be understood as administrator permission, that is, supreme permission, including various configuration functions (including configuration of use permission of another user, charging rate setting, and the like), an adaptive economical charging function (for example, stagger charging, namely, charging at a lowest charging rate), and a bidirectional charging function (for example, the electric vehicle feeds electricity to a power grid or a family by using the wireless charging station when a charging rate is high) in wireless charging. The common charging permission may be understood as permission of a common authorized user, and may include a unilateral charging function and a function of charging free of charge or charging at a low charging rate. The temporary charging permission may be understood as permission of a temporary authorized user, and includes only a unilateral charging function and has a relatively high charging rate.

Figure 6A:
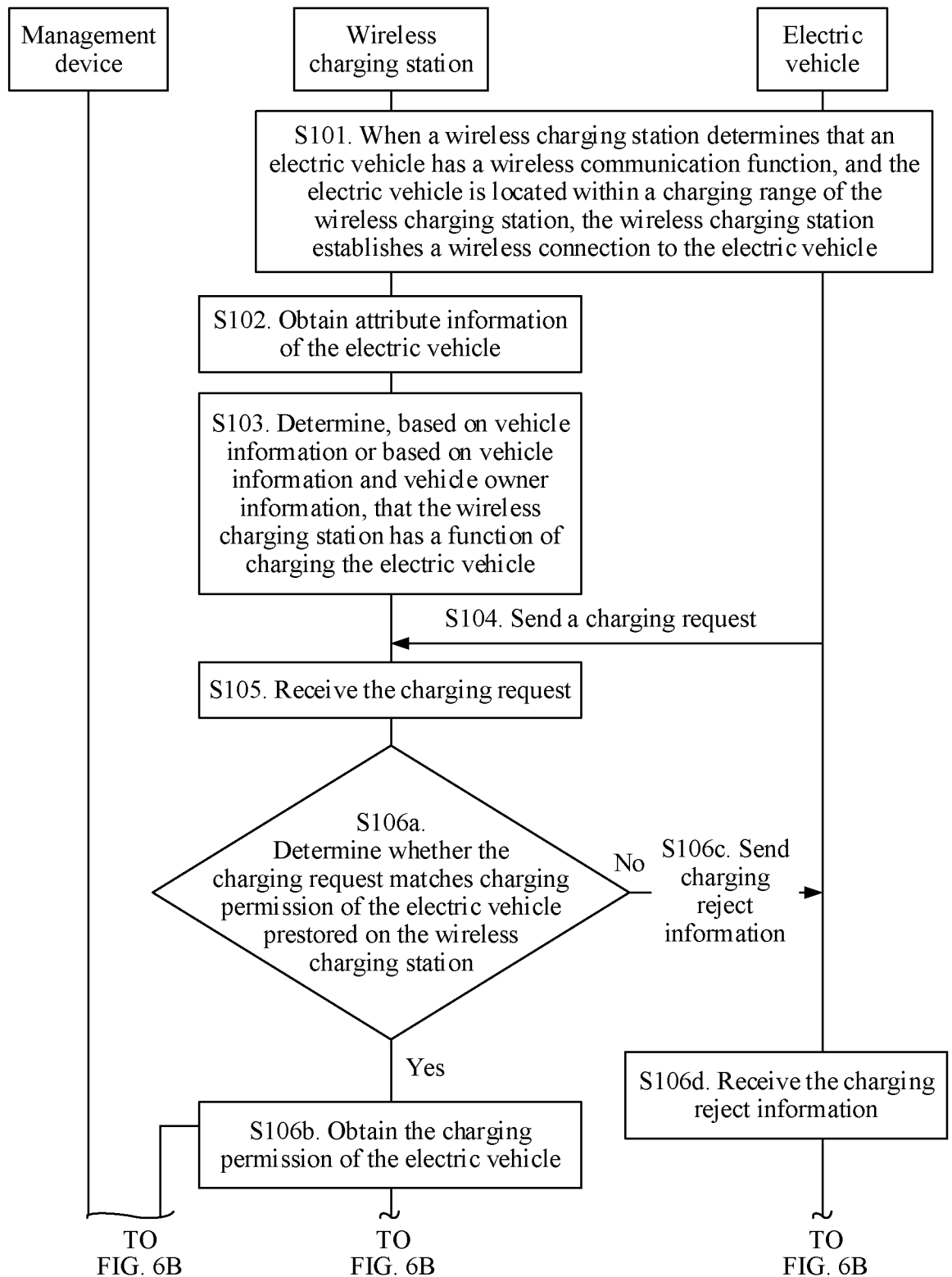
FIG. 6A and FIG. 6B are a second schematic flowchart of an electric vehicle wireless charging method according to an embodiment of the present application.
Figure 6B:
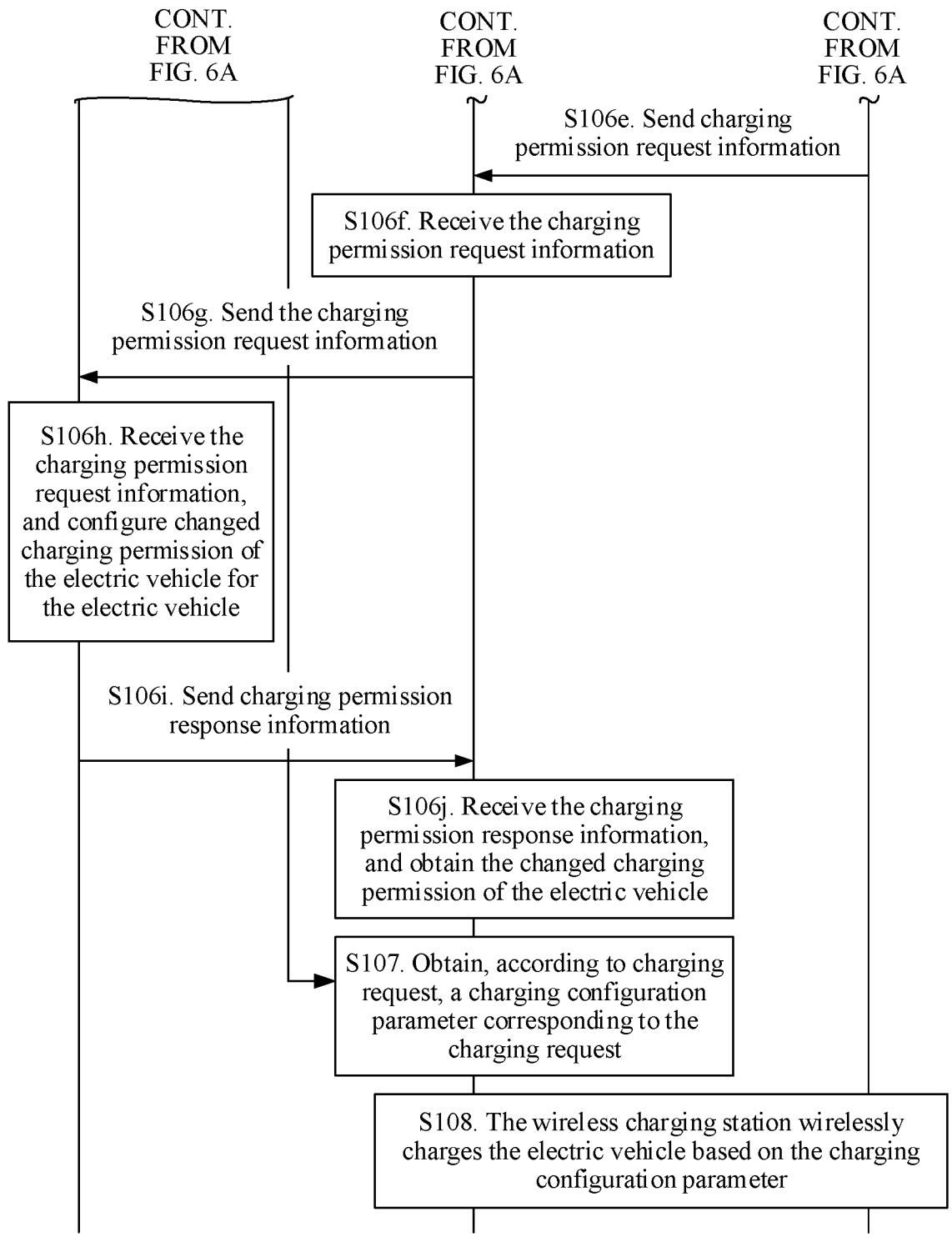

Specifically, as shown in FIG. 6A and FIG. 6B, step S106 may include steps S106a to S106j.

S106a. The wireless charging station determines whether the charging request matches the charging permission of the electric vehicle prestored on the wireless charging station.

S106b. If the charging request matches the charging permission of the electric vehicle prestored on the wireless charging station, obtain the charging permission of the electric vehicle.

For example, the wireless charging station may store a list of correspondences between vehicle information (including a model of an electric vehicle and a license plate number of the electric vehicle), vehicle owner information (including an owner name of the electric vehicle), and charging permission of the electric vehicle, as shown in Table 3.

TABLE 3

| Vehicle information | | Vehicle owner information | |
|---|---|---|---|
| Model of an electric vehicle | License plate number of the electric vehicle | (owner name of the electric vehicle) | Charging permission of the electric vehicle |
| Brand A Model x | Jing A11111 | Li XX | Management charging permission |
| Brand B Model y | Hu B22222 | Zhang XX | Common charging permission |
| Brand C Model z | Shaan C33333 | Zhao XX | Temporary charging permission |
| . . . | . . . | . . . | . . . |

It can be learned from Table 3 that when the wireless charging station learns that the model of the electric vehicle is Brand A Model x, the license plate number is Jing A11111, and the owner name is Li XX, the wireless charging station may learn from Table 3 that the charging permission of the electric vehicle is the management charging permission; likewise, when the wireless charging station learns that the model of the electric vehicle is Brand B Model y, the license plate number is Hu B22222, and the owner name is Zhang XX, the wireless charging station may learn from Table 3 that the charging permission of the electric vehicle is the common charging permission; and when the wireless charging station learns that the model of the electric vehicle is Brand C Model z, the license plate number is Shaan C33333, and the owner name is Zhao XX, the wireless charging station may learn from Table 3 that the charging permission of the electric vehicle is the temporary charging permission.

Therefore, the wireless charging station may determine from Table 3 whether the charging request matches the charging permission of the electric vehicle prestored on the wireless charging station.

Optionally, Table 2 and Table 3 in the foregoing embodiment may be presented in one list in an actual application. This is not specifically limited in this embodiment of the present application.

S106c. If the charging request does not match the charging permission of the electric vehicle prestored on the wireless charging station, the wireless charging station sends charging reject information to the electric vehicle, where the charging reject information is used to indicate that the charging request does not match the charging permission of the electric vehicle prestored on the wireless charging station, and the wireless charging station rejects charging the electric vehicle.

It should be noted that, that the charging request does not match the charging permission of the electric vehicle prestored on the wireless charging station includes but is not limited to the following two cases: 1. At least one of the charging duration requested by the electric vehicle, the start charging time requested by the electric vehicle, the charging rate requested by the electric vehicle, the charging power requested by the electric vehicle, and management permission requested by the electric vehicle does not match the charging permission of the electric vehicle prestored on the wireless charging station. 2. The charging permission of the electric vehicle prestored on the wireless charging station is empty, in other words, the electric vehicle has not been charged in the wireless charging station, and the wireless charging station has not stored the charging permission of the electric vehicle.

In the foregoing two cases, the wireless charging station may send the charging reject information to the electric vehicle, and correspondingly, the electric vehicle may receive the charging reject information sent by the wireless charging station.

S106*d*. The electric vehicle receives the charging reject information sent by the wireless charging station.

S106*e*. The electric vehicle sends charging permission request information to the wireless charging station, where the charging permission request information is used to request to change the charging permission of the electric vehicle prestored on the wireless charging station.

S106*f*. The wireless charging station receives the charging permission request information sent by the electric vehicle.

After the electric vehicle receives the charging reject information sent by the wireless charging station, if the electric vehicle still expects to be charged in the wireless charging station, the electric vehicle needs to request to change the charging permission of the electric vehicle prestored on the wireless charging station, so that the wireless charging station obtains changed charging permission of the electric vehicle. Therefore, the electric vehicle needs to send the charging permission request information used to request the changed charging permission of the electric vehicle to the wireless charging station. Correspondingly, the wireless charging station may receive the charging permission request information sent by the electric vehicle.

S106*g*. The wireless charging station sends the charging permission request information to a management device.

S106*h*. The management device receives the charging permission request information sent by the wireless charging station, and configures changed charging permission of the electric vehicle for the electric vehicle.

After the wireless charging station receives the charging permission request information sent by the electric vehicle, the wireless charging station may send the charging permission request information to the management device, so that the management device configures the changed charging permission of the electric vehicle for the electric vehicle based on the charging permission request information sent by the wireless charging station.

It should be noted that the management device provided in this embodiment of the present application may be an electronic device of an administrator, an electronic device of a wireless charging station owner, or any device that can implement a management function. This is not specifically limited in the present application.

Optionally, the electronic device may be but is not limited to an electronic computer, a notebook computer, a tablet computer, and a smartphone.

S106*i*. The management device sends charging permission response information to the wireless charging station, where the charging permission response information includes at least the changed charging permission of the electric vehicle configured by the management device for the electric vehicle.

S106*j*. The wireless charging station receives the charging permission response information sent by the management device, and obtains the changed charging permission of the electric vehicle.

It should be noted that step S106*b* is in parallel with steps S106*c* to S106*j*. If step S106*b* is performed in the electric vehicle wireless charging method provided in this embodiment of the present application, the steps S106*c* to S106*j* do not need to be performed; or if the steps S106*c* to S106*j* are performed in the electric vehicle wireless charging method provided in this embodiment of the present application, step S106*b* does not need to be performed.

S107. The wireless charging station obtains, according to the charging request, a charging configuration parameter corresponding to the charging request.

S108. The wireless charging station wirelessly charges the electric vehicle based on the charging configuration parameter.

After the wireless charging station obtains the charging permission of the electric vehicle, the wireless charging station may obtain, according to the charging request, the charging configuration parameter corresponding to the charging request, and wirelessly charge the electric vehicle based on the charging configuration parameter.

It may be understood that after the charging is completed, the electric vehicle may further send a charging termination signal to the wireless charging station, so that the wireless charging station stops charging the electric vehicle.

This embodiment of the present application provides an electric vehicle wireless charging method, including: receiving, by the wireless charging station, the charging request sent by the electric vehicle, where the charging request is used to request the wireless charging station to wirelessly charge the electric vehicle, the charging request includes the charging time request and the charging mode request, the charging time request includes at least one of the charging duration requested by the electric vehicle and the start charging time requested by the electric vehicle, and the charging mode request includes at least one of the charging rate requested by the electric vehicle, the charging power requested by the electric vehicle, and the management permission requested by the electric vehicle; determining, by the wireless charging station, that the charging request matches the charging permission of the electric vehicle prestored on the wireless charging station; obtaining, by the wireless charging station according to the charging request, the charging configuration parameter corresponding to the charging request; and wirelessly charging, by the wireless charging station, the electric vehicle based on the charging configuration parameter. Based on the descriptions in the foregoing embodiment, before the electric vehicle wireless charging method provided in this embodiment of the present application is used to charge the electric vehicle, the charging configuration parameter can be configured for the electric vehicle pertinently according to the charging request sent by the electric vehicle and the charging permission of the electric vehicle, so as to use the configured charging configuration parameter to charge the electric vehicle. In comparison with a conventional electric vehicle wireless charging method, different charging permission can be set for different electric vehicles, thereby meeting personalization charging requirements of different electric vehicles. In addition, because different electric vehicles have different charging permission, the wireless charging station can perform effective management on an electric vehicle based on charging permission of the electric vehicle, thereby avoiding resource waste of the wireless charging station.

The embodiments of the present application provide a wireless charging station, and the wireless charging station is configured to perform steps performed by the wireless charging station in the foregoing electric vehicle wireless charging method. The wireless charging station provided in the embodiments of the present application may include modules corresponding to corresponding steps.

In the embodiments of the present application, functional modules of the wireless charging station may be obtained through division based on the foregoing method example. For example, each functional module may be obtained through division based on each function, or two or more functions may be integrated into one functional module. The integrated module may be implemented in a form of hardware, or may be implemented in a form of a software functional module. The module division in the embodiments of the present application is an example, and is merely logical function division. There may be another division manner in an actual implementation.

Figure 7:
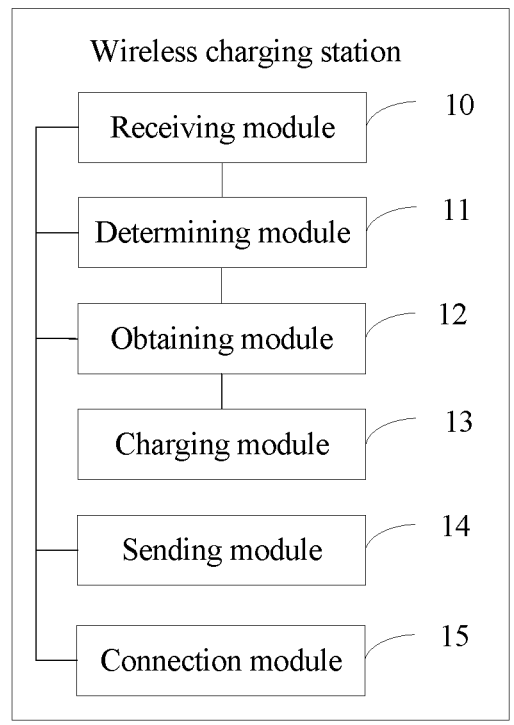
FIG. 7 is a first schematic structural diagram of a wireless charging station according to an embodiment of the present application.

When each functional module is obtained through division based on each function, FIG. 7 is a possible schematic structural diagram of a wireless charging station in the foregoing embodiment. As shown in FIG. 7, the wireless charging station includes a receiving module 10, a determining module 11, an obtaining module 12, a charging module 13, a sending module 14, and a connection module 15. The receiving module 10 is configured to support the wireless charging station in performing S105 in FIG. 5 and FIG. 6A and FIG. 6B, and S106f and S106j in FIG. 6A and FIG. 6B. The determining module 11 is configured to support the wireless charging station in performing S103 in FIG. 5 and FIG. 6A and FIG. 6B, and S106a in FIG. 6A and FIG. 6B. The obtaining module 12 is configured to support the wireless charging station in performing S102 and S107 in FIG. 5 and FIG. 6A and FIG. 6B, and S106b in FIG. 6A and FIG. 6B. The charging module 13 is configured to support the wireless charging station in performing S108 in FIG. 5 and FIG. 6A and FIG. 6B. The sending module 14 is configured to support the wireless charging station in performing S106c in FIG. 6A and FIG. 6B. The connection module 15 is configured to support the wireless charging station in performing S101 in FIG. 5 and FIG. 6A and FIG. 6B. All related content of steps in the foregoing method embodiments may be cited in function descriptions of corresponding functional modules, and details are not described herein again.

Figure 8:
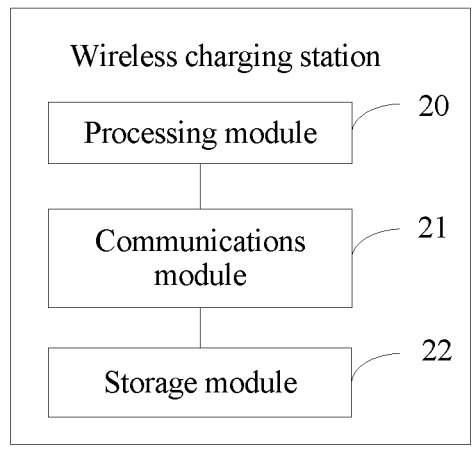
FIG. 8 is a second schematic structural diagram of a wireless charging station according to an embodiment of the present application.

When an integrated unit is used, FIG. 8 is a possible schematic structural diagram of a wireless charging station in the foregoing embodiment. As shown in FIG. 8, the wireless charging station includes a processing module 20 and a communications module 21. The processing module 20 is configured to control and manage actions of the wireless charging station. For example, the processing module 20 is configured to support the wireless charging station in performing S101 to S103, S107, and S108 in FIG. 5 and FIG. 6A and FIG. 6B, and S106a and S106b in FIG. 6A and FIG. 6B, and/or other processes of the technology described in this specification. The communications module 21 is configured to support the wireless charging station in communicating with an electric vehicle. For example, the communications module 21 is configured to support the wireless charging station in performing S105 in FIG. 5 and FIG. 6A and FIG. 6B, and S106c, S106f, and S106j in FIG. 6A and FIG. 6B. The wireless charging station may further include a storage module 22, configured to store program code and data of the wireless charging station.

The processing module 20 may be a processor or a controller such as a central processing unit (CPU) or a digital signal processor (DSP). The processing module 20 may implement or execute various examples of logical blocks, modules, and circuits that are described with reference to the content disclosed in the present application. The communications module 21 may be a transceiver, a transceiver circuit, a communications interface, or the like. The storage module 22 may be a memory.

Figure 9:
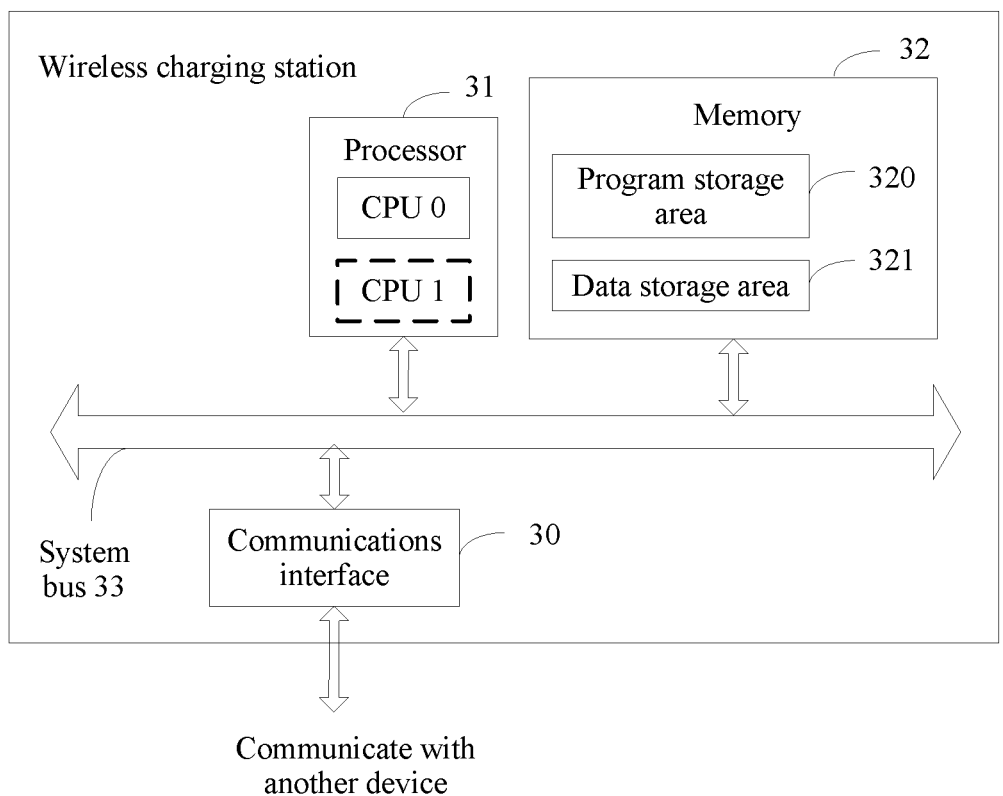
FIG. 9 is a third schematic structural diagram of a wireless charging station according to an embodiment of the present application.

When the processing module 20 is a processor, the communications module 21 is a communications interface, and the storage module 22 is a memory, the wireless charging station in this embodiment of the present application may be a wireless charging station shown in FIG. 9.

As shown in FIG. 9, the wireless charging station includes a communications interface 30, a processor 31, and a memory 32. The communications interface 30, the processor 31, and the memory 32 are connected to each other by using a system bus 33, and complete communication with each other.

When the wireless charging station runs, the wireless charging station performs the electric vehicle wireless charging method in the embodiment shown in FIG. 5 and FIG. 6A and FIG. 6B. For a specific electric vehicle wireless charging method, refer to related descriptions in the embodiment shown in FIG. 5 and FIG. 6A and FIG. 6B. Details are not described herein again.

The communications interface 30 is configured to communicate with another device or a communications network, for example, an electric vehicle or a management device.

The memory 32 may be configured to store a software program and an application module. By running the software program and the application module that are stored in the memory 32, the processor 31 executes various functional applications of the wireless charging station and performs data processing.

The memory 32 may mainly include a program storage area 320 and a data storage area 321. The program storage area 320 may store an operating system and an application program required by at least one function. The data storage area 321 may store control information, historical wireless charging data information, and the like.

The memory 32 may be a read-only memory (ROM) or another type of static storage device capable of storing static information and instructions, or a random access memory (RAM) or another type of dynamic storage device capable of storing information and instructions; or may be an electrically erasable programmable read-only memory (EEPROM), a magnetic disk storage medium or another magnetic storage device, or any other medium that can be used to carry or store expected program code having a form of an instruction or data structure and that can be accessed by the wireless charging station. However, the memory 32 is not limited thereto.

The memory 32 may exist independently and is connected to the processor 31 by using the system bus 33. Alternatively, the memory 32 may be integrated with the processor 31.

The processor 31 is a control center of the wireless charging station. The processor 31 is connected to each part of the entire wireless charging station by using various interfaces and lines, and performs various functions of the wireless charging station and data processing by running or executing the software program and/or the application module that are/is stored in the memory 32 and by invoking data stored in the memory 32, so as to perform overall monitoring on the wireless charging station.

In a specific implementation, in an embodiment, the processor 31 may include one or more CPUs. For example, the processor 31 in FIG. 9 includes a CPU 0 and a CPU 1.

The system bus 33 may be classified into an address bus, a data bus, a control bus, and the like. In this embodiment of the present application, for clarity of description, various buses are marked as the system bus 33 in FIG. 9.

The embodiments of the present application provide an electric vehicle, and the electric vehicle is configured to perform steps performed by the electric vehicle in the foregoing electric vehicle wireless charging method. The electric vehicle provided in the embodiments of the present application may include modules corresponding to corresponding steps.

In the embodiments of the present application, functional modules of the electric vehicle may be obtained through division based on the foregoing method example. For example, each functional module may be obtained through division based on each function, or two or more functions may be integrated into one functional module. The integrated module may be implemented in a form of hardware, or may be implemented in a form of a software functional module. The module division in the embodiments of the present application is an example, and is merely logical function division. There may be another division manner in an actual implementation.

Figure 10:
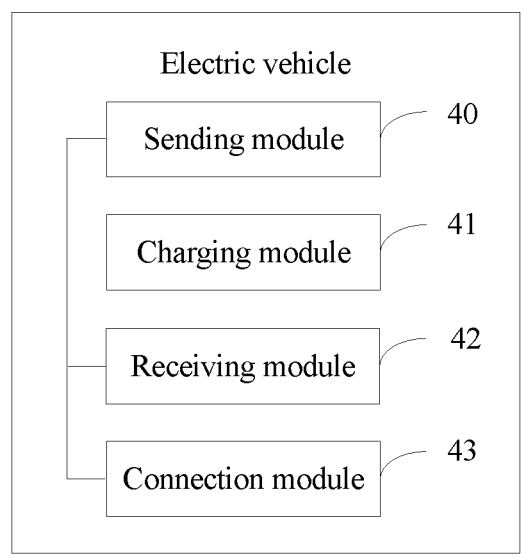
FIG. 10 is a first schematic structural diagram of an electric vehicle according to an embodiment of the present application.

When each functional module is obtained through division based on each function, FIG. 10 is a possible schematic structural diagram of an electric vehicle in the foregoing embodiment. As shown in FIG. 10, the electric vehicle includes a sending module 40, a charging module 41, a receiving module 42, and a connection module 43. The sending module 40 is configured to support the electric vehicle in performing S104 in FIG. 5 and FIG. 6A and FIG. 6B, and S106e in FIG. 6A and FIG. 6B. The charging module 41 is configured to support the electric vehicle in performing S108 in FIG. 5 and FIG. 6A and FIG. 6B. The receiving module 42 is configured to support the electric vehicle in performing S106d in FIG. 6A and FIG. 6B. The connection module 43 is configured to support the electric vehicle in performing S101 in FIG. 5 and FIG. 6A and FIG. 6B. All related content of steps in the foregoing method embodiments may be cited in function descriptions of corresponding functional modules, and details are not described herein again.

Figure 11:
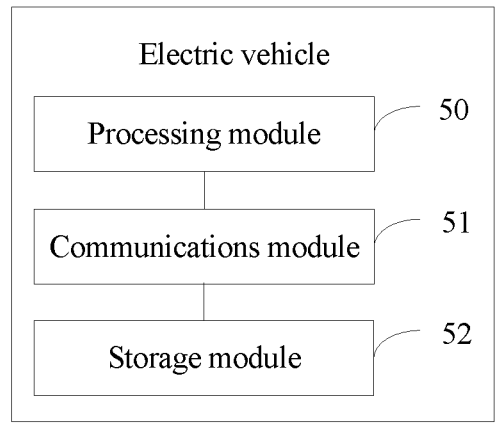
FIG. 11 is a second schematic structural diagram of an electric vehicle according to an embodiment of the present application.

When an integrated unit is used, FIG. 11 is a possible schematic structural diagram of an electric vehicle in the foregoing embodiment. As shown in FIG. 11, the electric vehicle includes a processing module 50 and a communications module 51. The processing module 50 is configured to control and manage actions of the electric vehicle. For example, the processing module 50 is configured to support the electric vehicle in performing S101 and S108 in FIG. 5 and FIG. 6A and FIG. 6B, and/or other processes of the technology described in this specification. The communications module 51 is configured to support the electric vehicle in communicating with a wireless charging station. For example, the communications module 51 is configured to support the electric vehicle in performing S104 in FIG. 5 and FIG. 6A and FIG. 6B, and S106d and S106e in FIG. 6A and FIG. 6B. The electric vehicle may further include a storage module 52, configured to store program code and data of the electric vehicle.

The processing module 50 may be a processor or a controller such as a CPU or a DSP. The processing module 50 may implement or execute various examples of logical blocks, modules, and circuits that are described with reference to the content disclosed in the present application. The communications module 51 may be a transceiver, a transceiver circuit, a communications interface, or the like. The storage module 52 may be a memory.

Figure 12:
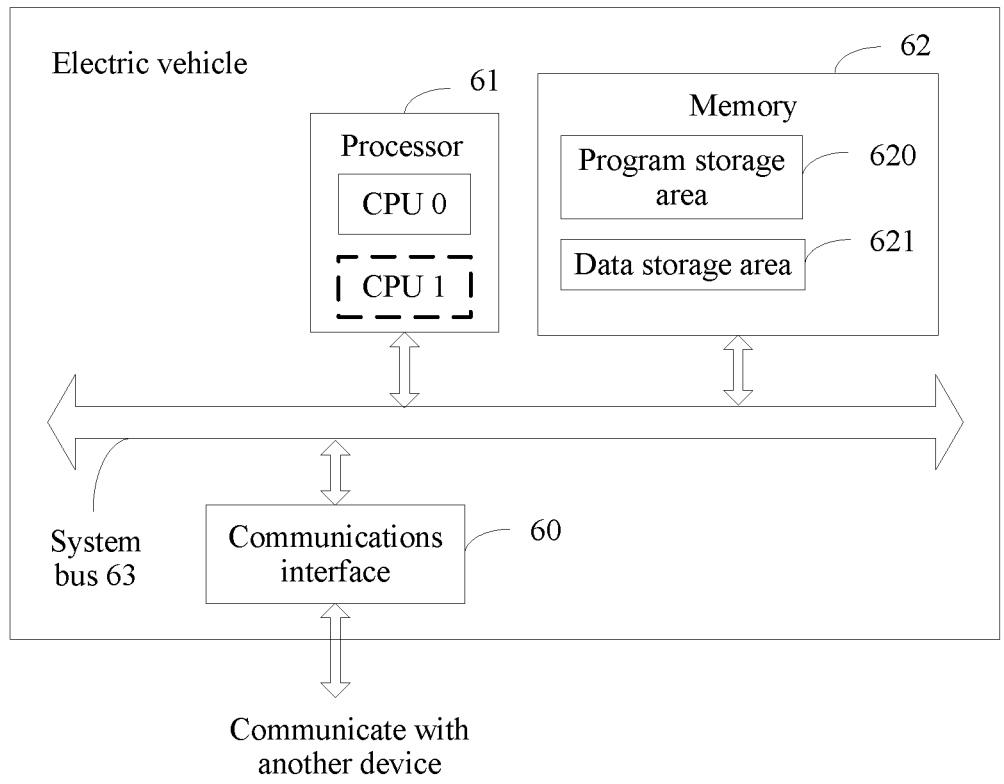
FIG. 12 is a third schematic structural diagram of an electric vehicle according to an embodiment of the present application.

When the processing module 50 is a processor, the communications module 51 is a communications interface, and the storage module 52 is a memory, the electric vehicle in this embodiment of the present application may be an electric vehicle shown in FIG. 12.

As shown in FIG. 12, the electric vehicle includes a communications interface 60, a processor 61, and a memory 62. The communications interface 60, the processor 61, and the memory 62 are connected to each other by using a system bus 63, and complete communication with each other.

When the electric vehicle runs, the electric vehicle performs the electric vehicle wireless charging method in the embodiment shown in FIG. 5 and FIG. 6A and FIG. 6B. For a specific electric vehicle wireless charging method, refer to related descriptions in the embodiment shown in FIG. 5 and FIG. 6A and FIG. 6B. Details are not described herein again.

The communications interface 60 is configured to communicate with another device or a communications network, for example, a wireless charging station or a management device.

The memory 62 may be configured to store a software program and an application module. By running the software program and the application module that are stored in the memory 62, the processor 61 executes various functional applications of the electric vehicle and performs data processing.

The memory 62 may mainly include a program storage area 620 and a data storage area 621. The program storage area 620 may store an operating system and an application program required by at least one function. The data storage area 621 may store control information, attribute information of the electric vehicle, and the like.

The memory 62 may be a ROM or another type of static storage device capable of storing static information and instructions, or a RAM or another type of dynamic storage device capable of storing information and instructions; or may be an EEPROM, a magnetic disk storage medium or another magnetic storage device, or any other medium that can be used to carry or store expected program code having a form of an instruction or data structure and that can be accessed by the electric vehicle. However, the memory 62 is not limited thereto.

The memory 62 may exist independently and is connected to the processor 61 by using the system bus 63. Alternatively, the memory 62 may be integrated with the processor 61.

The processor 61 is a control center of the electric vehicle. The processor 61 is connected to each part of the entire electric vehicle by using various interfaces and lines, and performs various functions of the electric vehicle and data processing by running or executing the software program and/or the application module that are/is stored in the memory 62 and by invoking data stored in the memory 62, so as to perform overall monitoring on the electric vehicle.

In a specific implementation, in an embodiment, the processor 61 may include one or more CPUs. For example, the processor 61 in FIG. 12 includes a CPU 0 and a CPU 1.

The system bus 63 may be classified into an address bus, a data bus, a control bus, and the like. In this embodiment of the present application, for clarity of description, various buses are marked as the system bus 63 in FIG. 12.

An embodiment of the present application further provides a wireless charging system, including a management device, at least one electric vehicle having any feature in the foregoing embodiments, and a wireless charging station having any feature in the foregoing embodiments. An embodiment of the present application further provides a software product, and the software product includes a computer instruction used to implement the electric vehicle wireless charging method. The computer instruction may be stored in a readable storage medium. A processor may read the computer instruction from the readable storage medium, so that the processor implements the electric vehicle wireless charging method.

It may be clearly understood by a person skilled in the art that, for the purpose of convenient and brief description, division of the foregoing functional modules is used as an example for illustration. In an actual application, the foregoing functions may be allocated to different functional modules and implemented based on a requirement, in other words, an inner structure of an apparatus is divided into different functional modules to implement all or some of the functions described above. For a detailed working process of the foregoing system, apparatus, and unit, refer to a corresponding process in the foregoing method embodiments, and details are not described herein.

In the several embodiments provided in the present application, it should be understood that the disclosed apparatus and method may be implemented in other manners. For example, the described apparatus embodiment is only an example. For example, the module or unit division is only logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, and may be located in one position, or may be distributed on a plurality of network units. Some or all of the units may be selected based on actual needs to achieve the objectives of the solutions of the embodiments.

In addition, functional units in the embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of the present application. The foregoing storage medium includes any medium that can store program code, such as a USB flash drive, a removable hard disk, a read-only memory (ROM), a random access memory (RAM), a magnetic disk, or an optical disc.

The descriptions are only specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An electric vehicle wireless charging method, comprising:
   receiving, by a wireless charging station, a charging request from an electric vehicle, wherein the charging request is used to request the wireless charging station to wirelessly charge the electric vehicle, the charging request comprises a charging time request and a charging mode request, the charging time request comprises at least one of charging duration requested by the electric vehicle or a start charging time requested by the electric vehicle;
   determining, by the wireless charging station, that the charging request matches charging permission of the electric vehicle prestored on the wireless charging station, wherein types of charging permissions prestored on the wireless charging station include a temporary charging permission, a common charging permission, and a management charging permission,
   wherein the temporary charging permission is a permission of a temporary authorized user and includes a first unilateral charging function;
   wherein the common charging permission is a permission of a common authorized user and includes a function of charging for free and a second unilateral charging function, wherein a charging rate of the second unilateral charging function is lower than a charging rate of the first unilateral charging function; and
   wherein the management charging permission is an administrator permission that including configuration functions, an adaptive economical charging function, and a bidirectional charging function in wireless charging;
   obtaining, by the wireless charging station according to the charging request, a charging configuration parameter corresponding to the charging request; and
   wirelessly charging, by the wireless charging station, the electric vehicle according to the charging configuration parameter.

2. The electric vehicle wireless charging method according to claim 1, further comprising:
   receiving, by the wireless charging station, a second charging request from a second electric vehicle;
   determining, by the wireless charging station, that the second charging request does not match charging permission of the second electric vehicle prestored on the wireless charging station; and
   sending, by the wireless charging station, charging reject information to the second electric vehicle, wherein the charging reject information is used to indicate that the second charging request does not match the charging permission of the second electric vehicle prestored on the wireless charging station, and the wireless charging station rejects charging the second electric vehicle.

3. The electric vehicle wireless charging method according to claim 2, wherein after the sending, by the wireless charging station, the charging reject information to the second electric vehicle, the method further comprises:
receiving, by the wireless charging station, charging permission request information sent by the second electric vehicle, wherein the charging permission request information is used to request to change the charging permission of the second electric vehicle prestored on the wireless charging station;
sending, by the wireless charging station, the charging permission request information to a management device; and
receiving, by the wireless charging station, charging permission response information from the management device, and obtaining changed charging permission of the second electric vehicle, wherein the charging permission response information comprises at least the changed charging permission of the second electric vehicle configured by the management device for the second electric vehicle.

4. The electric vehicle wireless charging method according to claim 1, wherein before the receiving, by the wireless charging station, the charging request from the electric vehicle, the method further comprises:
obtaining, by the wireless charging station, attribute information of the electric vehicle, wherein the attribute information comprises at least vehicle information and vehicle owner information of the electric vehicle; and
determining, by the wireless charging station based on the vehicle information or based on the vehicle information and the vehicle owner information, that the wireless charging station has a function of charging the electric vehicle.

5. The electric vehicle wireless charging method according to claim 4, wherein before the obtaining, by the wireless charging station, the attribute information of the electric vehicle, the method further comprises:
in response to determining that the electric vehicle has a wireless communication function and that the electric vehicle is located within a charging range of the wireless charging station, establishing, by the wireless charging station, a wireless connection to the electric vehicle.

6. An electric vehicle wireless charging method, comprising:
sending, by an electric vehicle, a charging request to a wireless charging station, wherein the charging request is used to request the wireless charging station to wirelessly charge the electric vehicle, the charging request comprises a charging time request and a charging mode request, the charging time request comprises at least one of charging duration requested by the electric vehicle or a start charging time requested by the electric vehicle; and
in response to the charging request matching charging permission of the electric vehicle prestored on the wireless charging station, receiving, by the electric vehicle, wireless charging from the wireless charging station based on a charging configuration parameter, wherein the charging configuration parameter is a charging configuration parameter that is corresponding to the charging request and that is obtained by the wireless charging station;
wherein types of charging permissions prestored on the wireless charging station include a temporary charging permission, a common charging permission, and a management charging permission,
wherein the temporary charging permission is a permission of a temporary authorized user and includes a first unilateral charging function;
wherein the common charging permission is a permission of a common authorized user and includes a function of charging for free and a second unilateral charging function, wherein a charging rate of the second unilateral charging function is lower than a charging rate of the first unilateral charging function; and
wherein the management charging permission is an administrator permission that including configuration functions, an adaptive economical charging function, and a bidirectional charging function in wireless charging.

7. The electric vehicle wireless charging method according to claim 6, wherein before the sending, by the electric vehicle, the charging request to the wireless charging station, the method further comprises:
establishing, by the electric vehicle, a wireless connection to the wireless charging station.

8. A wireless charging station, comprising:
a receiver;
a processor; and
a charging device,
wherein the receiver is configured to receive a charging request from an electric vehicle, wherein the charging request is used to request the wireless charging station to wirelessly charge the electric vehicle, the charging request comprises a charging time request and a charging mode request, the charging time request comprises at least one of charging duration requested by the electric vehicle or a start charging time requested by the electric vehicle;
wherein the processor is configured to:
determine that the charging request matches charging permission of the electric vehicle prestored on the wireless charging station, wherein types of charging permissions prestored on the wireless charging station include a temporary charging permission, a common charging permission, and a management charging permission,
wherein the temporary charging permission is a permission of a temporary authorized user and includes a first unilateral charging function;
wherein the common charging permission is a permission of a common authorized user and includes a function of charging for free and a second unilateral charging function, wherein a charging rate of the second unilateral charging function is lower than a charging rate of the first unilateral charging function; and
wherein the management charging permission is an administrator permission that including configuration functions, an adaptive economical charging function, and a bidirectional charging function in wireless charging; and
after determining that the charging request matches the charging permission of the electric vehicle prestored on the wireless charging station, obtain, according to the charging request, a charging configuration parameter corresponding to the charging request; and wherein the charging device is configured to wirelessly charge the electric vehicle based on the charging configuration parameter.

9. The wireless charging station according to claim 8, further comprising:
a transmitter;
wherein the receiver is further configured to receive a second charging request sent by a second electric vehicle;
wherein the processor is further configured to determine that the second charging request does not match a charging permission of the second electric vehicle prestored on the wireless charging station; and
wherein the transmitter is configured to: after the processor determines that the charging request does not match the charging permission of the second electric vehicle prestored on the wireless charging station, send charging reject information to the second electric vehicle, wherein the charging reject information is used to indicate that the second charging request does not match the charging permission of the second electric vehicle prestored on the wireless charging station, and the wireless charging station rejects charging the second electric vehicle.

10. The wireless charging station according to claim 9, wherein:
the receiver is further configured to: after the transmitter sends the charging reject information to the second electric vehicle, receive charging permission request information from the second electric vehicle, wherein the charging permission request information is used to request to change the charging permission of the second electric vehicle prestored on the wireless charging station;
the transmitter is further configured to: after the receiver receives the charging permission request information sent by the second electric vehicle, send the charging permission request information to a management device;
the receiver is further configured to: after the transmitter sends the charging permission request information to the management device, receive charging permission response information from the management device, wherein the charging permission response information comprises at least changed charging permission of the second electric vehicle configured by the management device for the second electric vehicle; and
the processor is further configured to: after the receiver receives the charging permission response information from the management device, obtain the changed charging permission of the second electric vehicle.

11. The wireless charging station according to claim 8, wherein the processor is further configured to:
before the receiver receives the charging request sent by the electric vehicle, obtain attribute information of the electric vehicle, wherein the attribute information comprises at least vehicle information and vehicle owner information of the electric vehicle; and
after obtaining the attribute information of the electric vehicle, determine, based on the vehicle information or based on the vehicle information and the vehicle owner information, that the wireless charging station has a function of charging the electric vehicle.

12. The wireless charging station according to claim 11, further comprising:
a wireless communication device;
wherein the processor is further configured to: before the obtaining the attribute information of the electric vehicle, determine that the electric vehicle has a wireless communication function and that the electric vehicle is located within a charging range of the wireless charging station; and
wherein the wireless communication device is configured to: after the processor determines that the electric vehicle has the wireless communication function and that the electric vehicle is located within the charging range of the wireless charging station, establish a wireless connection to the electric vehicle.

13. An electric vehicle, comprising:
a transmitter configured to send a charging request to a wireless charging station, wherein the charging request is used to request the wireless charging station to wirelessly charge the electric vehicle, the charging request comprises a charging time request and a charging mode request, the charging time request comprises at least one of charging duration requested by the electric vehicle or a start charging time requested by the electric vehicle; and
a charging device configured to: after the transmitter sends the charging request to the wireless charging station and in response to the charging request matching charging permission of the electric vehicle prestored on the wireless charging station, receive wireless charging from the wireless charging station based on a charging configuration parameter, wherein the charging configuration parameter is a charging configuration parameter that is corresponding to the charging request and that is obtained by the wireless charging station;
wherein types of charging permissions prestored on the wireless charging station include a temporary charging permission, a common charging permission, and a management charging permission,
wherein the temporary charging permission is a permission of a temporary authorized user and includes a first unilateral charging function;
wherein the common charging permission is a permission of a common authorized user and includes a function of charging for free and a second unilateral charging function, wherein a charging rate of the second unilateral charging function is lower than a charging rate of the first unilateral charging function; and
wherein the management charging permission is an administrator permission that including configuration functions, an adaptive economical charging function, and a bidirectional charging function in wireless charging.

14. The electric vehicle according to claim 13, further comprising:
a wireless communication device configured to: before the transmitter sends the charging request to the wireless charging station, establish a wireless connection to the wireless charging station.

15. The electric vehicle wireless charging method according to claim 1, wherein the charging request of the electric vehicle matches the management charging permission, the method further comprising:
receiving, by the wireless charging station, a management request from the electric vehicle to change configurations prestored on the wireless charging station; and
performing, by the wireless charging station, one or more management operations based on the management request from the electric vehicle, to change the configurations prestored on the wireless charging station.

16. The electric vehicle wireless charging method according to claim 1, wherein the charging request of the electric vehicle matches the management charging permission, the method further comprising:
receiving, by the wireless charging station, electricity from the electric vehicle based on a request from the electric vehicle.

17. The electric vehicle wireless charging method according to claim 6, wherein the charging request of the electric vehicle matches the management charging permission, the method further comprising:
sending, by the electric vehicle, a management request to change configurations prestored on the wireless charging station.

18. The electric vehicle wireless charging method according to claim 6, wherein the charging request of the electric vehicle matches the management charging permission, the method further comprising:
charging, by the electric vehicle, the wireless charging station based on a request from the electric vehicle.

19. The wireless charging station according to claim 8,
wherein the charging request of the electric vehicle matches the management charging permission;
wherein the receiver is further configured to receive a management request from the electric vehicle to change configurations prestored on the wireless charging station; and
wherein the processor is further configured to perform one or more management operations based on the management request from the electric vehicle, to change the configurations prestored on the wireless charging station.

20. The wireless charging station according to claim 13,
wherein the charging request of the electric vehicle matches the management charging permission; and
wherein the transmitter is further configured to send a management request to change configurations prestored on the wireless charging station.

* * * * *